United States Patent [19]
Schlüter

[11] Patent Number: 5,868,399
[45] Date of Patent: Feb. 9, 1999

[54] SEALING WEB WITH FIBER COATED MARGINAL AREAS

[75] Inventor: Werner Schlüter, Iserlohn, Germany

[73] Assignee: Schlüter Systems GmbH, Iserlohn, Germany

[21] Appl. No.: 847,661

[22] Filed: Apr. 22, 1997

[30] Foreign Application Priority Data

Apr. 24, 1996 [DE] Germany ............... 196 16 310.2

[51] Int. Cl.⁶ .............................................. E04B 1/68
[52] U.S. Cl. ........................ 277/650; 277/906; 52/396.04
[58] Field of Search ........................ 277/590, 628, 277/650, 652, 654, 906, 936, 944; 52/393, 396.04, 396.01, 396.08, 396.06

[56] References Cited

U.S. PATENT DOCUMENTS

| | | | |
|---|---|---|---|
| 1,917,834 | 7/1933 | Gillies | 277/650 X |
| 3,455,077 | 7/1969 | Long | 52/396.04 X |
| 4,599,841 | 7/1986 | Haid | 52/396.04 |
| 5,615,897 | 4/1997 | Akita | 277/654 |
| 5,765,332 | 6/1998 | Landin et al. | 52/396.01 |

FOREIGN PATENT DOCUMENTS

| | | |
|---|---|---|
| 8814650 | 4/1989 | Germany . |
| 9317637 | 3/1994 | Germany . |

*Primary Examiner*—Anthony Knight
*Assistant Examiner*—Greg Binda
*Attorney, Agent, or Firm*—Collard & Roe, P.C.

[57] ABSTRACT

A sealing web is useful for installation in the joint areas of floors or walls, to which layers of plaster, tiles or boards may be applied with an adhesive, especially if layers or coverings are produced in connection with the sealing of the floor or wall surface. The sealing web includes a stretchable plastic sheet having an uncovered center section located between two marginal sections which are coated with fiber material.

6 Claims, 1 Drawing Sheet

SEALING WEB WITH FIBER COATED MARGINAL AREAS

BACKGROUND OF THE INVENTION

1. Field of the Invention

The present invention relates to a sealing web for bridging expansion joints in structures comprising a stretchable plastic sheet bridging the area of the joint. This plastic sheet is impermeable to moisture, and the marginal sections of this plastic sheet are coated with fiber material solidly secured to the plastic sheet. The marginal sections have at least partly projecting zones of fibers for attaching the plastic sheet to the substrate under it, while leaving uncovered a stretchable center section of the plastic sheet on the top side in the running direction of the sealing web.

2. The Prior Art

Such a sealing web is known from DE 93 17 637 U1. The sealing strip according to this prior art document consists of a plastic sheet web, on which provision is made on both of its sides for an adhesive base for gluing and sealing compounds. The adhesive base is formed by the surface of strips of fleece which have marginal areas that protrude laterally beyond the edge of the web sheet. On their inner sides the strips of fleece are vulcanized into the surface of the web sheet. This is done in such a way that the surface of the web sheet is structured and formed within the zone of its marginal sections by protruding fleece fibers. Good adhesive conditions are available within the area of the adhesive base for gluing the base to a wall covering, for example such as tiles. The elasticity of the web sheet is preserved within the center section.

The drawback with this known sealing web is that the plastic sheet is glued to the ground or substrate under it with the fleece sections serving as an adhesive base like a block of pavement, covering the expansion joint on the top side. Thus, it is possible for fleece strip sections to project beyond the plastic sheet solely for the purpose of securing the plastic sheet onto the substrate. Gluing of the plastic sheet with the sheet resting on the substrate, so as to prevent moisture from penetrating the expansion joint laterally, is not possible with the adhesive intended for gluing the sections of fleece material. The lateral penetration of water seeping into the expansion joint is at best reduced only in that the plastic sheet is marginally pressed onto the substrate by the projecting fleece arranged on the top side. However, as a rule, effective sealing can not be assured due to the roughness of the substrate. In any case, even with such a solution, a hollow marginal space remains, in which water, for example coming from cross joints can circulate in such a hollow space between the fleece material and the plastic sheet, and penetrate into the expansion joint.

The sealing web according to DE 93 17 637 U1 is suitable for application to a wall area. However, the known sealing web is unsuitable for application in the floor area particularly if the floor is subjected to certain types of loads, for example shipping traffic across the floor. The plastic sheet is readily deformable relative to the projecting fleece material which has been hardened by the adhesive. Thus, the plastic sheet represents a substrate that is flexible within certain limits versus other types of zones. Especially with load bearing industrial floors, which, for example, are covered with tiles, and where load bearing traffic takes place on such floors, the tiles in these marginal zones will rest upon a substrate that is yielding to different degrees. This poses the risk that the tiles may break in such transitional zones.

DE-design patent 88 14 650 describes a sealing web intended for area sealing of entire floor sections. However, such a sealing web is unsuitable for bridging expansion joints because they lack elastic properties.

SUMMARY OF THE INVENTION

It is an object of the present invention to provide a sealing web for bridging expansion joints in structures, in connection with which the undesirable penetration of seeping water into the expansion joint is not only effectively prevented, but which is also suitable for application for bridging expansion joints in floor areas.

This object is achieved according to the present invention by having the width of the sealing web correspond with the width of the plastic sheet, and by having the two marginal sections of the plastic sheet being coated in the longitudinal running direction with fiber material both on the top side and the bottom side of the plastic sheet.

The advantages resulting from the present invention are the following. Due to the fact that the plastic sheet is positioned along the total width of the sealing web, protruding zones reacting differently as a substrate with respect to their stability properties are avoided. Therefore, the sealing web according to the invention is applicable without limitations also in floor areas stressed by load bearing floor traffic without having the fear that floor tiles will tend to form cracks under the load. By coating the plastic sheet in its marginal sections on both the top side and the bottom side with fiber material, an adhesive base is formed on both of these sides of the plastic sheet. Thus, the plastic sheet can be glued both to a substrate beneath it and to a floor covering above it. The only non-glued section of the plastic sheet is the one for which no coating is intended, and which bridges the expansion joint for assuring the elastic properties of the sealing web. Adjoining sections of the floor connected by such a sealing web can therefore be provided with a sealing web which is impermeable to moisture. Thus, it is assured that different movements of the floor sections, for example due to thermal changes, can be compensated for and simultaneously the feature of moisture impermeability of the sealing web remains assured.

The present invention is thusly an improvement over the sealing webs according to the subject matter of DE-GM 88 14 650. By means of the present invention, it is possible to effectively seal floors or walls across their entire areas.

The width of the uncovered section of the sealing web which is free from any fibers in the longitudinal running direction of the web preferably ranges between about 10 to 40 mm. The adjacent, covered marginal sections preferably support a fleece-like fiber material, which has its fibers partly melted into the plastic sheet. Thus, the fibers or fiber sections partly project beyond the sheet, so as to form an adequate adhesive base for adhesives, mortar, or sealing material that can be smoothed out to form a level surface.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFFERRED EMBODIMENTS

Figure 1:
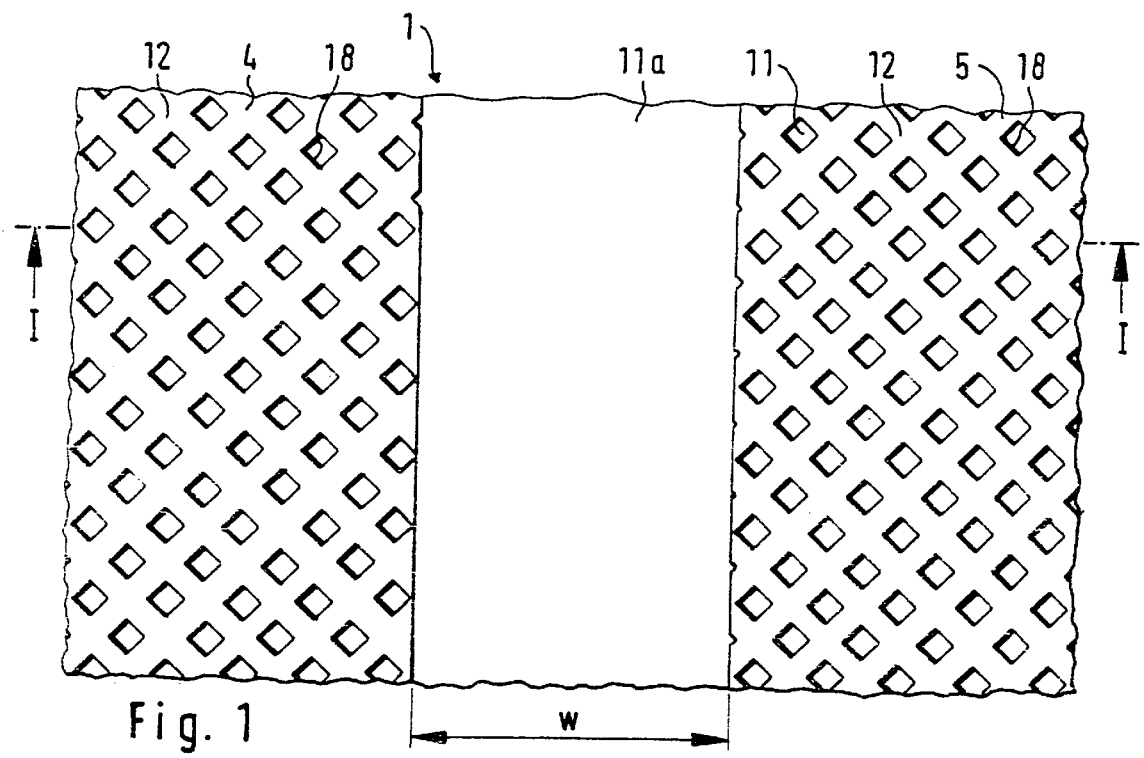
FIG. 1 shows a top view of a sealing web.
Figure 2:
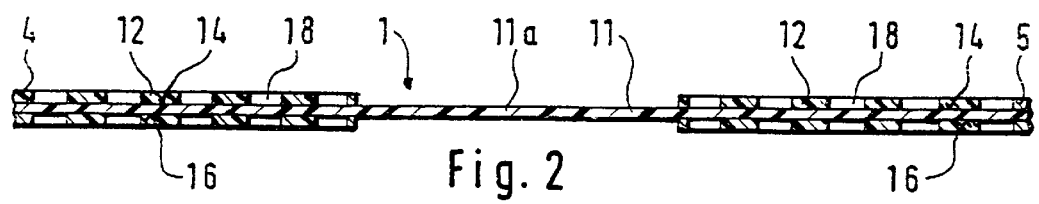
FIG. 2 shows a section view along line I—I in FIG. 1.
Figure 3:
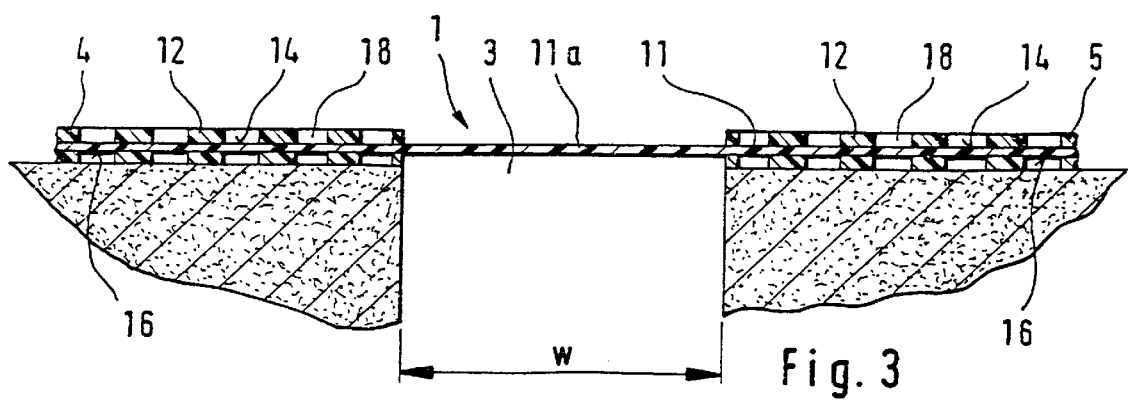
FIG. 3 shows a cross section view through a joint area covered with a sealing web.

Turning now in detail to the drawings, in FIG. 3 reference numeral 3 denotes a joint between the two floor sections or substrates 2. For sealing purposes and later for applying a covering material, for example tiles or boards within the zone of the floor sections 2, this joint 3 is covered with the glued-on sealing web denoted as a whole by numeral 1.

This sealing web 1 preferably has a width of 125 to 230 mm. Web 1 is made of a flexible, elastic plastic sheet 11 having a partly projecting, fleece-like fiber material 12 laminated and melted into this plastic sheet 11 on both the top side 14 of this sheet and the bottom side 16 of this sheet. The center section forms the uncovered, stretchable section 11a, which section 11a has a width w which is at least equal to the width of the joint. The width of section 11a usually ranges between about 10 to 40 mm. The marginal sections or areas 4 and 5 are on each side of the center section 11a.

While the center section 11a is free from any fiber coating, the marginal sections or areas 4 and 5 of the web 1 are shown as being covered with a coating arrangement of zones or clumps of fibers 12. Between the clumps of fibers 12 is this checker board pattern of squares and diamonds of uncovered areas 18 which are free from any fiber coating.

Examples of the plastic material from which the plastic sheet 11 can be made include thermoplastics such as polyolefins such as polyethylene, polypropylene, polybutylene or mixtures of these as copolymers or terpolymers. Examples of the fiber fleece material 12 include polyvinyl chloride or polyacrylamide.

While several embodiments of the present invention have been shown and described, it is to be understood that many changes and modifications may be made thereunto without departing from the spirit and scope of the invention as defined in the appended claims.

What is claimed is:

1. Sealing web for bridging an expansion joint in a structure, comprising an elastic stretchable plastic sheet for bridging the joint, said sheet being impermeable to moisture; said sheet having a top side and a bottom side;

said sheet having two marginal areas which are each coated with fiber material with at least partly projecting zones of fibers for attaching the plastic sheet to an underlying substrate, said fiber material being solidly secured to the plastic sheet;

a stretchable center section of the plastic sheet is positioned between said two marginal areas and is free of any coating of fiber material in a longitudinal running direction of the sealing web;

said sealing web having a width and said plastic sheet having a width, and the width of the sealing web corresponding to the width of the plastic sheet; and the two marginal areas of the plastic sheet are coated with the fiber material in the running direction both on the top side of said sheet and on the bottom side of said sheet.

2. Sealing web according to claim 1, wherein the center section has a constant width which ranges between about 10 to 40 mm.

3. Sealing web according to claim 1, wherein the fiber material is a fleece.

4. Sealing web according to claim 1, wherein the fiber material is partly fused into the plastic sheet.

5. Sealing web according to claim 1, wherein the elastic sheet is a flexible, elastic material.

6. Sealing web according to claim 1, wherein the marginal areas are covered with zones comprising clumps of fibers and between said clumps of fibers is a checkerboard pattern of squares and diamonds of uncovered areas free from any fiber coating.

* * * * *